United States Patent
Yao et al.

(10) Patent No.: US 8,015,297 B2
(45) Date of Patent: Sep. 6, 2011

(54) METHOD FOR DETECTING FAULT IN NEXT GENERATION NETWORK

(75) Inventors: Xin Yao, Shenzhen (CN); Jianxiong Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 384 days.

(21) Appl. No.: 12/026,023

(22) Filed: Feb. 5, 2008

(65) Prior Publication Data

US 2008/0201478 A1  Aug. 21, 2008

Related U.S. Application Data

(63) Continuation of application No. PCT/CN2006/001112, filed on May 26, 2006.

(30) Foreign Application Priority Data

Aug. 5, 2005  (CN) .......................... 2005 1 0087703

(51) Int. Cl.
*G06F 15/16* (2006.01)
*G06F 11/00* (2006.01)

(52) U.S. Cl. .......................................... 709/227; 714/43
(58) Field of Classification Search .................. 709/227; 714/43

See application file for complete search history.

(56) References Cited

U.S. PATENT DOCUMENTS

| | | | | |
|---|---|---|---|---|
| 4,999,829 A * | 3/1991 | Fite et al. | ....................... | 370/218 |
| 6,061,728 A | 5/2000 | Mead et al. | | |
| 6,314,399 B1 * | 11/2001 | Deligne et al. | ................ | 704/257 |
| 6,560,648 B1 * | 5/2003 | Dunn et al. | ..................... | 709/224 |
| 7,415,536 B2 | 8/2008 | Nakazawa | | |
| 2002/0143905 A1 | 10/2002 | Govindarajan et al. | | |
| 2003/0009561 A1 * | 1/2003 | Sollee | ............................ | 709/227 |
| 2003/0023730 A1 | 1/2003 | Wengrovitz et al. | | |
| 2004/0032862 A1 | 2/2004 | Schoeneberger et al. | | |

(Continued)

FOREIGN PATENT DOCUMENTS

CN   1501644 A   6/2004

(Continued)

OTHER PUBLICATIONS

Cisco.com. "Using the Extended ping and Extended traceroute Commands." Published on the Internet on May 15, 2001. <URL: www.cisco.com.*

(Continued)

*Primary Examiner* — Joseph Avellino
*Assistant Examiner* — James Baron
(74) *Attorney, Agent, or Firm* — Leydig, Voit & Mayer, Ltd.

(57) ABSTRACT

A method for detecting fault in a next generation network includes: establishing a tool set and a corresponding command set for detecting whether the network is connective and detecting a range of network fault; creating dynamically in a PROXY an address mapping table storing a correspondence relationship between a user identifier userid and address information of a user terminal; and upon occurrence of a fault in the network, obtaining the address information of the user terminal from the address mapping table according to the userid of the user terminal probed currently, executing the set of command according to the address information, and probing connectivity of the network between the PROXY and the user terminal. The problem that the network address transform (NAT) device and the firewall cannot be traversed may be avoided, and the fault point or range may be detected accurately in the NGN where a fault occurs.

10 Claims, 5 Drawing Sheets

U.S. PATENT DOCUMENTS

| | | | |
|---|---|---|---|
| 2004/0208186 A1 | 10/2004 | Eichen et al. | |
| 2005/0030955 A1 | 2/2005 | Galin et al. | |
| 2005/0050398 A1 | 3/2005 | Rao et al. | |
| 2007/0094412 A1 | 4/2007 | Sollee | |
| 2007/0192508 A1 | 8/2007 | Sollee | |
| 2008/0037436 A1* | 2/2008 | Liu | 370/250 |
| 2008/0198767 A1* | 8/2008 | Lebrun et al. | 370/254 |

FOREIGN PATENT DOCUMENTS

| | | | |
|---|---|---|---|
| CN | 1567894 A | | 1/2005 |
| EP | 1309142 A1 | | 5/2003 |
| EP | 1 441 487 A2 | | 7/2004 |
| EP | 1441487 A | * | 7/2004 |
| EP | 1919131 A1 | * | 5/2008 |
| JP | 2004-179764 A | | 6/2004 |
| KR | 10-2005-0002546 A | | 1/2005 |
| WO | WO 02/47331 A2 | | 6/2002 |
| WO | WO 02/103981 A2 | | 12/2002 |

OTHER PUBLICATIONS

Cisco.com. "Understanding the Ping and Traceroute Commands." Published on the Internet on May 15, 2001. <URL: www.cisco.com.*

Conta et al., "Internet Control Message Protocol (ICMPv6) for the Internet Protocol Version 6 (IPv6) Specification," *IETF Standard*, 1-19 (Dec. 1, 1998) http://rfc2463.txt.

Jennings et al., "Managing Client Initiated Connections in the Session Initiation Protocol (SIP)," *IETF Standard* (*Working Draft*), sip: 1-24 (Jul. 11, 2005) http://draft-ietf-sip-outbound-00.txt.

Vishal, "SIP Traceroute and Ping," Columbia University, 1-2 (Nov. 14, 2007) http://www1.cs.columbia.edu/{vs2140/probjects/sip_tracert/report.html.

Chunming et al., "Network testing and troubleshooting experience," Railway Signalling & Communication, 40 (2): 30-31 (Feb. 2004).

State Intellectual Property Office of the People's Republic of China, First Examination Report in Chinese Patent Application No. 200510087703.3 (Aug. 17, 2007).

State Intellectual Property Office of the People's Republic of China, Second Examination Report in Chinese Patent Application No. 200510087703.3 (Feb. 22, 2008).

State Intellectual Property Office of the People's Republic of China, Written Opinion of the International Searching Authority in International Patent Application No. PCT/CN2006/011112 (Sep. 14, 2006).

* cited by examiner

METHOD FOR DETECTING FAULT IN NEXT GENERATION NETWORK

CROSS-REFERENCE TO RELATED APPLICATIONS

This application is a continuation of International Patent Application No. PCT/CN2006/001112, filed May 26, 2006, which claims priority to Chinese Patent Application No. 200510087703.3, filed Aug. 5, 2005, both of which are hereby incorporated by reference.

FIELD OF THE INVENTION

The present invention relates to Next Generation Network technologies and in particular to a method for detecting fault in a next generation network.

BACKGROUND OF THE INVENTION

The mobile communication field is one of the industries with the fiercest competition. Telecommunication operators are increasingly requiring differentiated services to enhance their competitiveness, and NGN technologies with soft switch and packet switch technologies as a core have become a focus in the industry. Stream media is a form of network multimedia emerging in recent years, and with the support of stream media, transport of multimedia information such as video, audio over a network has evolved from previous download manner to a stream transport manner.

FIG. 1 is a schematic diagram of a typical networking mode for a PROXY in the NGN network. As illustrated in FIG. 1, the PROXY is one of important devices in the NGN. For an end user in the NGN, the PROXY is equivalent to a server; and for a core server in the NGN, the PROXY is equivalent to a terminal. A PROXY is required to support one or more proxy functions in the protocols of Session Initiation Protocol (SIP), H.323, Media Gateway Control Protocol (MGCP), and H.248. Because the PROXY participates in the entire signaling processing flow, the PROXY may obtain detailed information in signaling on user registration, call, etc. The PROXY generally includes tow parts, i.e. a Signaling Proxy and a Media Proxy.

The Signaling Proxy (SP) is adapted to process messages of registration, call, etc., of an end user. The messages of registration, call, etc., of the end users are firstly sent to the PROXY. The PROXY forwards the messages to a core soft switch system after signaling processing. The core soft switch system returns the received messages of registration, call, etc., to the PROXY after signaling processing, and the PROXY forwards the messages to a user terminal after signaling processing.

The Media Proxy (MP) is adapted to act as a proxy for a media stream of video, audio, etc., of an end user. All media streams intercommunicated between the end user on behalf of whom the PROXY acts and the external are processed and forwarded by the PROXY. When the end user attached to the PROXY acts as a caller, a called as seen by caller is the PROXY, and the address of the called as seen by the caller is the address of the PROXY.

Both the SP and the MP are logical concepts. An SP can communicate with one or more MPs and may be integrated with an MP in one device. An SP and an MP may also be implemented respectively with separate devices or be implemented by being integrated in other devices such as an edge session controller and a firewall.

In order to overcome the scarcity of IPv4 addresses, most corporations dispose a Network Address Translation (NAT) device at a network egress, which translates an internal private network address into an address for accessing a public network. In order to improve network security, most corporations dispose a Fire Wall (FW) at the network egress. In a practical application, the firewall and the NAT device are typically implemented by being integrated in one entity which functions to both translate an internal address and improve network security.

FIG. 2 is a schematic diagram of a typical networking mode for the PROXY in the NGN network with the NAT/FW. As illustrated in FIG. 2, some terminals such as a terminal 1 and a terminal 2 have an access to the PROXY through the NAT/FW, and some terminals such as a terminal 3 and a terminal 4 are connected to the PROXY.

A terminal may fail during practical operations, for example, the terminal is not able to be put through. At this time, network maintenance personal wish to find the exact reason why a service cannot be carried out for the terminal as soon as possible, for example, a fault of the terminal, a fault occurring in the NAT/FW device or a fault of the network.

A fault detection method in the related art detects and locates a fault by sending a probing (PING) command and a route probing (TRACEROUTE) command of the network layer to an IP address of a user terminal.

The function of the PING command is to detect whether the user terminal is accessible from the network layer by PINGing the IP address of the user terminal. In other words, whether the user is accessible from the network layer.

The function of the TRACEROUTE command is to detect a route forwarding path to the user terminal and to locate a route fault point by TRACEROUTEing the user terminal.

The existing fault detection method has the following characteristics.

1. The use of the PING and TRACEROUTE commands is forbidden on the firewall, at least a host outside the network is forbidden to PING or TRACEROUTE a host inside the network, and therefore a connection condition of the network provided with the firewall may not be detected effectively through the PING and TRACEROUTE commands.

2. In a practical application, a NAT device is commonly disposed over the network, a request to a user terminal may reach the soft switch system only if the user terminal passes through one or more NAT devices, and an IP address allocated to the user terminal is typically a private network address. Consequently, the PING or TRACEROUTE command sent from the PROXY to the user terminal may not traverse the NAT device(s), i.e. a condition of the network connection from the NAT device(s) to the user terminal may not be detected.

3. In a practical application, an IP address of a user terminal is generally allocated dynamically. For example, the IP address is obtained through the Dynamic Host Configuration Protocol (DHCP) or other dynamic manners. Consequently, no PING or TRACEROUTE operation can be performed unless the IP address of the user terminal is determined regardless of whether the NAT/FW device is present in the network.

SUMMARY OF THE INVENTION

In view of this, a main object of the invention is to provide a fault detection method in a next generation network, and according to this method a condition of a network connection between a proxy device and a terminal in the NGN may be effectively detected.

In order to attain the above object, technical solutions of the invention are implemented as follows.

A fault detection method in a next generation network for creating a set of commands for probing whether the network is connective and probing a network fault range and the method includes:

A. creating dynamically in a PROXY an address mapping table which stores a correspondence relationship between a user identifier userid and address information of a user terminal; and B. upon occurrence of a fault in the network, obtaining, by the PROXY, the address information of the user terminal from the address mapping table in accordance with the userid of the user terminal probed currently, executing the set of command in accordance with the address information, and probing connectivity of the network between the PROXY and the user terminal.

In the step A, creating the address mapping table includes: in a preset period of time T, reading the userid and the address information of the user terminal from a registration message and storing them correspondingly into the address mapping table when the user terminal is registered successfully; or removing the userid and the corresponding address information of the user terminal stored in the address mapping table when the user terminal is deregistered; or updating or aging synchronously the corresponding userid and address information in the address mapping table when a userid and corresponding address information in a registry is updated or aged.

In step B, probing connectivity of the network between the PROXY and the user terminal includes:

B11. executing an extended probing PING command in the set of commands; searching, by the PROXY, the address mapping table to determine whether a record corresponding to the userid is found; if the record corresponding to the userid is found, going to step B12; otherwise, prompting absence of user registration and ending the flow;

B12. determining whether an IP address in the address information of the user terminal is PINGed successfully; if an IP address in the address information of the user terminal is PINGed successfully, prompting that the network from the PROXY to the user terminal is connective and ending the flow; otherwise, going to step B13;

B13. executing an extended route probing TRACEROUTE command in the set of commands; searching, by the PROXY, the address mapping table to determine whether a record corresponding to the userid is found; if a record corresponding to the userid is found, going to step B14; otherwise, prompting that user registration information has changed and ending the flow; and B14. determining, by the PROXY, a fault point or a fault range in accordance with a probing result.

The method further includes: upon detecting that the network between the PROXY and the user terminal is connective, executing, by the PROXY, the set of commands in accordance with address information of a soft switch related to the user terminal in the network, and probing connectivity of the network between the PROXY and the soft switch.

Step B further includes: constructing, by the PROXY, a message in an application layer protocol, sending the message to the user terminal, and probing connectivity of the network between the PROXY and the user terminal in accordance with a response message returned from the user terminal.

In step B, probing connectivity of the network between the PROXY and the user terminal includes:

B21. executing an extended probing PING command in the set of commands; determining whether an IP address of a Network Address Translation/Fire Wall NAT/FW between the user terminal and the PROXY is PINGed successfully; if an IP address of a Network Address Translation/Fire Wall NAT/FW between the user terminal and the PROXY is PINGed successfully, setting a PING success flag for the NAT/FW; otherwise, searching, by the PROXY, the address mapping table to determine whether a record corresponding to the userid is found; if a record corresponding to the userid is found, constructing, by the PROXY, a message in accordance with a protocol and sending the message to the user terminal; otherwise, prompting absence of user registration and ending the flow;

B22. constructing, by the PROXY, a message in accordance with an application layer protocol and sending the message to an IP address corresponding to the userid of the user terminal; determining whether a response message is received; if a response message is received, prompting that the network from the PROXY to the user terminal is connective and ending the flow; otherwise, going to step B23;

B23. determining whether a PING success flag is set for the NAT/FW; if a PING success flag is set for the NAT/FW, going to step B24; otherwise, going to step B25;

B24. determining, by the NAT/FW, whether an IP address of the user terminal is PINGed successfully; if an IP address of the user terminal is PINGed successfully, prompting that the network from the PROXY to the user terminal is connective and ending the flow; otherwise, going to step B26;

B25. executing an extended route probing TRACEROUTE command in the set of commands; and determining whether the PROXY is connected to the NAT/FW device; if the PROXY is connected to the NAT/FW device, going back to step B24; otherwise, going to step B27;

B26. executing an extended route probing TRACEROUTE command in the set of commands; and determining whether the NAT/FW is connected to the user terminal; if the NAT/FW is connected to the user terminal, prompting that the network from the PROXY to the user terminal is connective and ending the flow; otherwise, going to step B27; and B27. determining, by the PROXY, a fault point or a fault range in accordance with a probing result.

The method further includes: setting a time-out timer; and in step B21, starting, by the PROXY, the time-out timer when constructing the message in accordance with the protocol and sending the message to the user terminal;

after no response message is received in step B22 and before going to step B23, the method further includes:

B221. determining whether the time-out timer expires; if not so, going back to making determination in step B22; otherwise, going to step B222; and B222. determining whether it is the first time that the time-out timer expires; if it is the first time that the time-out timer expires, adjusting a timing length of time for the time-out timer and going back to step B22; otherwise, going to step B23.

The message constructed in step B22 is:

a communication capability inquiry command OPTION message of the Session Initiation Protocol SIP; or a notification request command RQNT message or an audit endpoint command AUEP message of the Media Gateway Control Protocol MGCP; or a status inquiry request command IRQ message of the H323 protocol.

The method further includes:

upon detecting that the network between the PROXY and the user terminal is connective, executing, by the PROXY, the set of commands in accordance with address information of a soft switch related to the user terminal in the network, constructing a message in an application layer protocol, sending the message to the soft switch, and probing connectivity of the network between the PROXY and the soft switch in accordance with a response message returned from the soft switch.

The constructed message is:

a keep-alive message or a re-registration command REGISTER message in the Session Initiation Protocol SIP; or a re-registration command RSIP message of the Media Gateway Control Protocol MGCP; or a status inquiry request command IRQ message of the H323 protocol.

The address information includes an IP address and a port number.

The set of utilities includes: extended probing APPPING for probing whether the network to a communication opposite end is connective and supporting the PING of the application layer and the PING function of the network layer; and extended route probing APPTRACEROUTE for probing a fault point or a fault range where a fault occurs in the network, encapsulating the traditional TRACEROUTE function and capable of obtaining the address information of the terminal through the PROXY in accordance with a protocol; and the set of commands includes: an extended PING command for probing whether the network is connective and in a command format of APPPING-p pro -t type object; and an extended TRACEROUTE command for probing a network fault range and in a command format of APPTRACEROUTE-p pro -t type object.

The set of commands is created in accordance with the set of utilities in combination with a communication protocol used between users, a user type and a user object.

The user object includes an IP address or a telephone number of a user or a symbol identifying an identity of the user.

As can be seen from the above technical solutions, the inventive method preset the set of commands and the set of utilities for probing whether the network is connective and probing a network fault range and creates dynamically the address mapping table which stores a correspondence relationship between an identifier (userid) of a user terminal and an IP address of the user terminal; and may detect a condition of the network connection of the PROXY to the terminal and further the PROXY to the soft switch by using the set of utilities, the set of commands and the address mapping table in the absence of a NAT/FW between the terminal and the PROXY.

Further, connectivity of the network from the PROXY to the terminal may be detected by using the set of utilities, the set of commands and the address mapping table in combination with the existing protocol of SIP/MGCP/H323 with a NAT/FW between the terminal and the PROXY. Further, The inventive method addresses the problem in the existing fault detection method that no PING or TRACEROUTE operation may be performed due to disability to determine an IP address of the user terminal and further addresses the problem of the network layer PING technology that a NAT device and a firewall cannot be traversed so as to effectively perform fault detection in the NGN and obtain a fault point or a fault range.

DETAILED DESCRIPTION OF THE INVENTION

Figure 1:
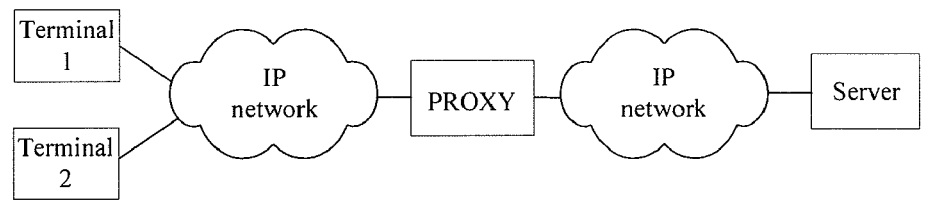
FIG. 1 is a schematic diagram of a typical networking mode for a PROXY in the NGN.
Figure 2:
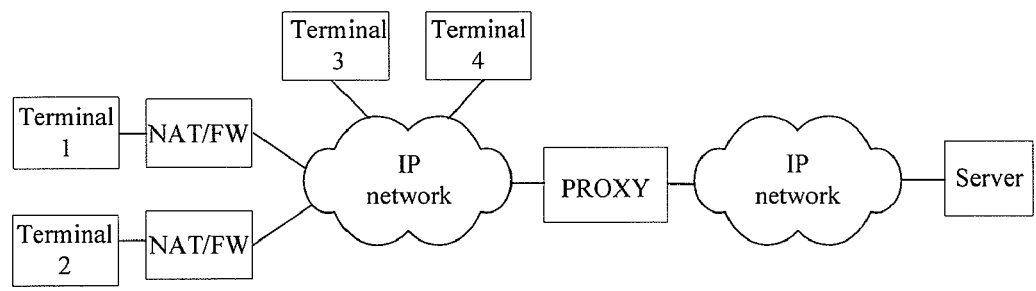
FIG. 2 is a schematic diagram of a typical networking mode for a PROXY in the NGN provided with a NAT/FW.

The core idea of the invention lies in that a set of utilities and a set of commands for probing whether the network is connective and probing a fault range are created; an address mapping table for storing a correspondence relationships between an identifier of a user terminal and an IP address of the user terminal is created dynamically in a PROXY; and a condition of a network connection between the PROXY and an opposite communication end is detected using the set of utilities, the set of commands and the address mapping table.

The invention is described further in detail in conjunction with the drawings and embodiments to make the object, technical solutions and advantages of the invention more apparent.

In the invention, firstly a set of two utilities and a set of two commands are set with reference to existing network probing utilities.

Particularly, the set of utilities includes:

extended probing (APPPING): which is adapted to probe whether a network is connected to a terminal and to support the PING function of the application layer and the traditional PING function of the network layer. The principle of implementing the PING of the application layer, is well known and the invention achieves the support by converting the principle into programs;

extended route probing (APPTRACEROUTE): which is adapted to probe a fault point or a fault range where a fault occurs in the network. The APPTRACEROUTE encapsulates the traditional TRACEROUTE function and may obtain address information of the terminal through the PROXY in accordance with the protocol of SIP/MGCP/H323, etc.

The set of utilities is user oriented. In other words, the user may use the utilities in the set of utilities to detect connectivity of the network. The set of utilities is used in a form of execution by clicking an interface such as the WINDOWS operation system or of command execution such as the DOS or UNIX operation system.

The set of commands is created in accordance with the set of utilities in combination with a communication protocol used between users, a user type and a user object such as an IP address or a telephone number of a user or a symbol identifying an identity of the user. The set of commands includes commands for probing whether the network is connective and a network fault range in accordance with a communication protocol used between users, an opposite user type and opposite user object information. The set of commands includes:

(1) an extended PING command, which is to probe whether the network is connective and is in a command format of APPPING-p pro -t type object.

-p pro: The pro indicates a protocol type such as SIP, MGCP, H.323;

-t type: The type indicates an object type such as a character string of term indicating a terminal or a character string of softx indicating a soft switch;
-object: It indicates a specific object such as an IP address, a userid, a telephone number or a similar symbol indicating an identifier of a user.

(2) An extended TRACEROUTE command, which is to probe a network fault range and is in a command format of APPTRACEROUTE-p pro -t type object.

-p pro: The pro indicates a protocol type such as SIP, MGCP, H.323;
-t type: The type indicates an object type such as term or softx;
-object: It indicates a specific object such as an IP address, a userid.

It shall be noted that when the object is an IP address of a soft switch, -p pro and -t type are meaningless; at this time, the APPTRACEROUTE-p pro -t type object is equivalent to the TRACEROUTE object where the objects is an IP address of the soft switch.

The set of commands is one of forms in which the set of utilities is used, and the shell of an operation system finally interprets the set of utilities into programs for execution regardless of the command execution form or the form of execution by interface clicking.

The set of utilities and the set of commands described above are provided with both the conventional function of probing the network layer and the function of probing connectivity of the application layer.

In the NGN, an IP address of a user terminal is fixed in a period of time T regardless of whether the IP address of the user terminal is allocated dynamically or statically, and therefore an address mapping table is created dynamically in the PROXY according to the invention. The address mapping table stores a correspondence relationship between the userid and address information of a user terminal such as an IP address and a port number.

Figure 3:
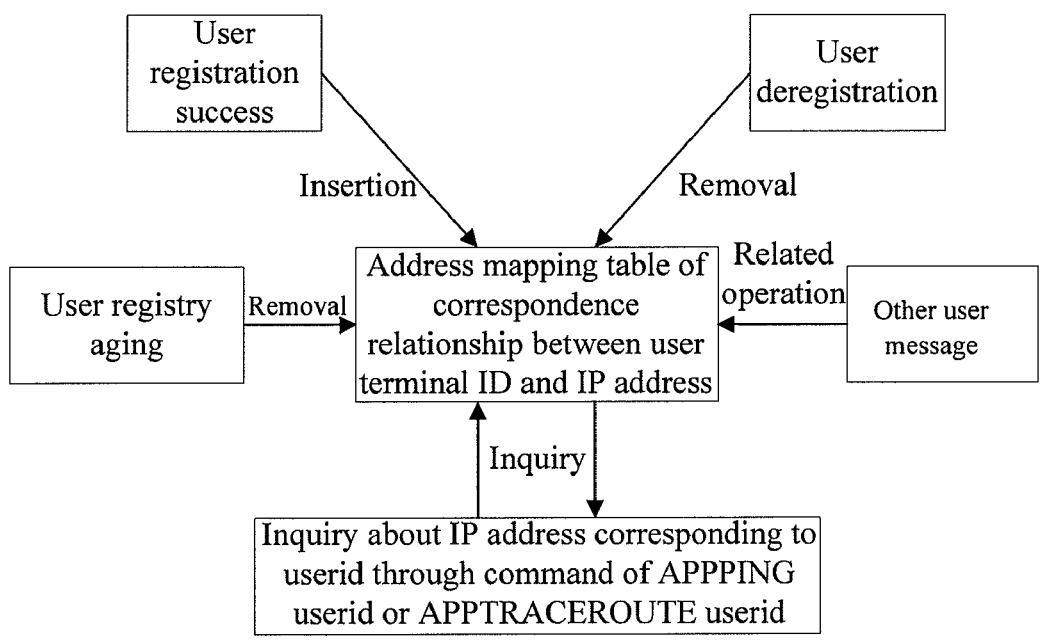
FIG. 3 is a schematic diagram of creation relationships with an address mapping table according to the invention.

FIG. 3 is a schematic diagram of creation relationships with an address mapping table. As illustrated in FIG. 3, during a period of time T, when a terminal is registered successfully, userid and address information of the user terminal are read from a registration message and added into the address mapping table which may be indexed by the userid. When a terminal is deregistered, address information corresponding to userid of the user terminal is removed from the address mapping table. Further, when a userid and corresponding address information in a registry is updated, aged or has another change, corresponding userid and address information in the address mapping table are caused to be updated, aged, etc., synchronously.

Therefore in the period of time T, the IP address of the user terminal may be determined in accordance with the userid of the user terminal and further a condition of the network connection of the PROXY to the user terminal may be detected in accordance with the IP address by use of the above address mapping table.

Figure 4:
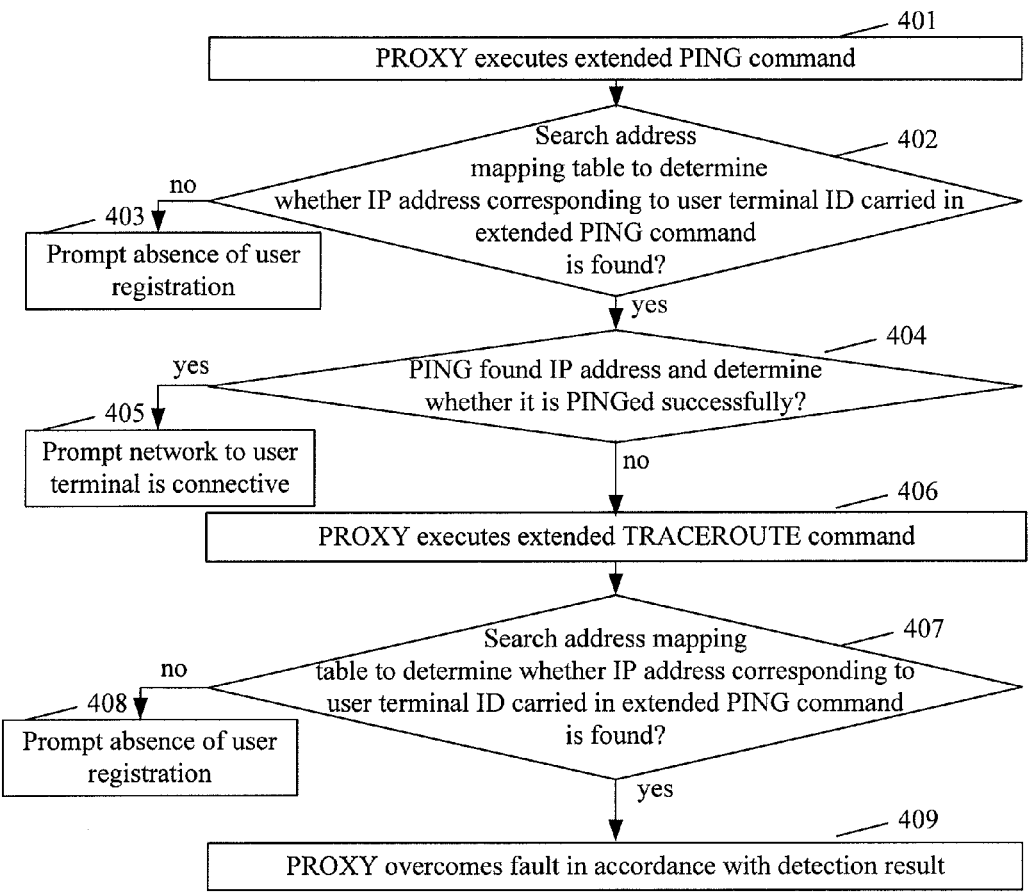
FIG. 4 is a flowchart of a fault detection method in the absence of a NAT/FW between a user terminal and a PROXY.

A specific flow of the inventive fault detection method in the absence of a NAT/FW between the user terminal and the PROXY is as illustrated in FIG. 4 and includes the following steps.

Step 401: The PROXY executes the extended PING command.

The command of APPPING-pro pro -t term userid is executed in accordance with the created set of commands, APPPING-pro pro -t type object, and a user terminal for which fault detection is required. Particularly, the term indicates that an object device for which fault probing is required is a user terminal, the userid is a symbol which identifies the user terminal, such as a telephone number, and which is recorded in the address mapping table reflecting a mapping relationship between the userid and the IP address of the user terminal.

Step 402: The address mapping table is searched to determine whether a record corresponding to the userid is found, and if found, the flow goes to the step 404; otherwise, the flow goes to the step 403.

The address mapping table is searched with the userid symbol in the command of APPPING-p pro -t term userid as an index.

Step 403: Absence of user registration is prompted and the flow ends.

If no corresponding record is found in the address mapping table in accordance with the userid of the user terminal, it is suggested that the user is not registered or registration information of the user is not recorded in the address mapping table, and at this time, prompt information is displayed such as no registration of the user.

Step 404: The IP address of the user terminal is PINGed to determine whether the PINGing is successful, and if the PINGing is successful, the flow goes to the step 405; otherwise, the flow goes to the step 406.

If a corresponding record is found in the address mapping table in accordance with the userid of the user terminal, i.e. the IP address of the user terminal is determined, the IP address of the user terminal is PINGed from the PROXY by using the existing PING command of the network layer.

Step 405: it is prompted that the network is connected to the user terminal and the flow ends.

If a response message is received in accordance with the operation of PINGing the IP address of the user terminal, which indicates a successful PING, it is indicated that the network is connected to the user terminal and there is no fault occurring on the network, and prompt information may be displayed such as connectivity of the network to the user terminal.

Step 406: The extended TRACEROUTE command is executed.

If no response message is received in accordance with the operation of PINGing the IP address of the user terminal, which indicates an unsuccessful PING, it is suggested that the network from the PROXY to the user terminal is not connective and there is a fault occurring on the network, and a fault point or a fault range where a fault occurs in the network from the PROXY to the user terminal is detected.

Step 407: The address mapping table is searched to determine whether a record corresponding to the userid is found, and if found, the flow goes the step 409; otherwise, the flow goes to the step 408.

Step 408: Absence of user registration is prompted and the flow ends.

If no corresponding record is found in the address mapping table in accordance with the userid of the user terminal, it is suggested that registration information of the user has changed such as removed or updated, and at this time, prompt information may be displayed such as that the registration information of the user has been updated.

Step 409: A fault is overcome in accordance with a detection result.

The fault is overcome by taking a corresponding measure in accordance with an execution result of the command of APPTRACEROUTE-p pro -t term userid. That is, the fault is overcome by taking a corresponding measure in accordance with the detected fault point or the fault range where the fault occurs in the network from the PROXY to the user terminal.

Probing of connectivity of a network from the PROXY to a soft switch without a NAT/FW is similar to this method except that in the command the type is softx and the object is an IP address of a soft switch server, and descriptions thereof will not be repeated. In a practical application, upon occurrence of a fault in the network, when it is detected that no fault is present between the user terminal and the PROXY, it is further determined whether a fault is present between the PROXY and the soft switch and a fault point or a fault range is determined. It shall be noted that detection of a condition of the network connection between the user terminal and the PROXY and detection of a condition of the network connection between the PROXY and the soft switch are not required to be in a sequential order.

Figure 5:
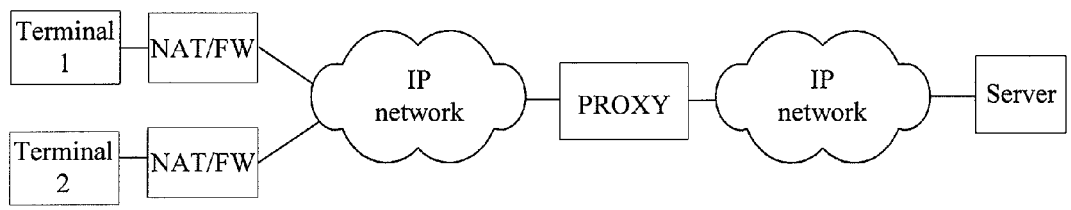
FIG. 5 is a schematic diagram of a network connection with a NAT/FW between a terminal and a PROXY.

In a practical application, a NAT/FW is typically disposed between the terminal and the PROXY, and a signaling message of the terminal generally reaches the PROXY only after the signaling message passes through the NAT/FW device. FIG. 5 is a schematic diagram of a network connection with a NAT/FW between the terminal and the PROXY. In this case, using the simple IP address PING command of the network layer, only a condition of the network connection of the PROXY to the NAT/FW device may be obtained, and the network connection of the PROXY to the terminal may not be obtained.

Figure 6:
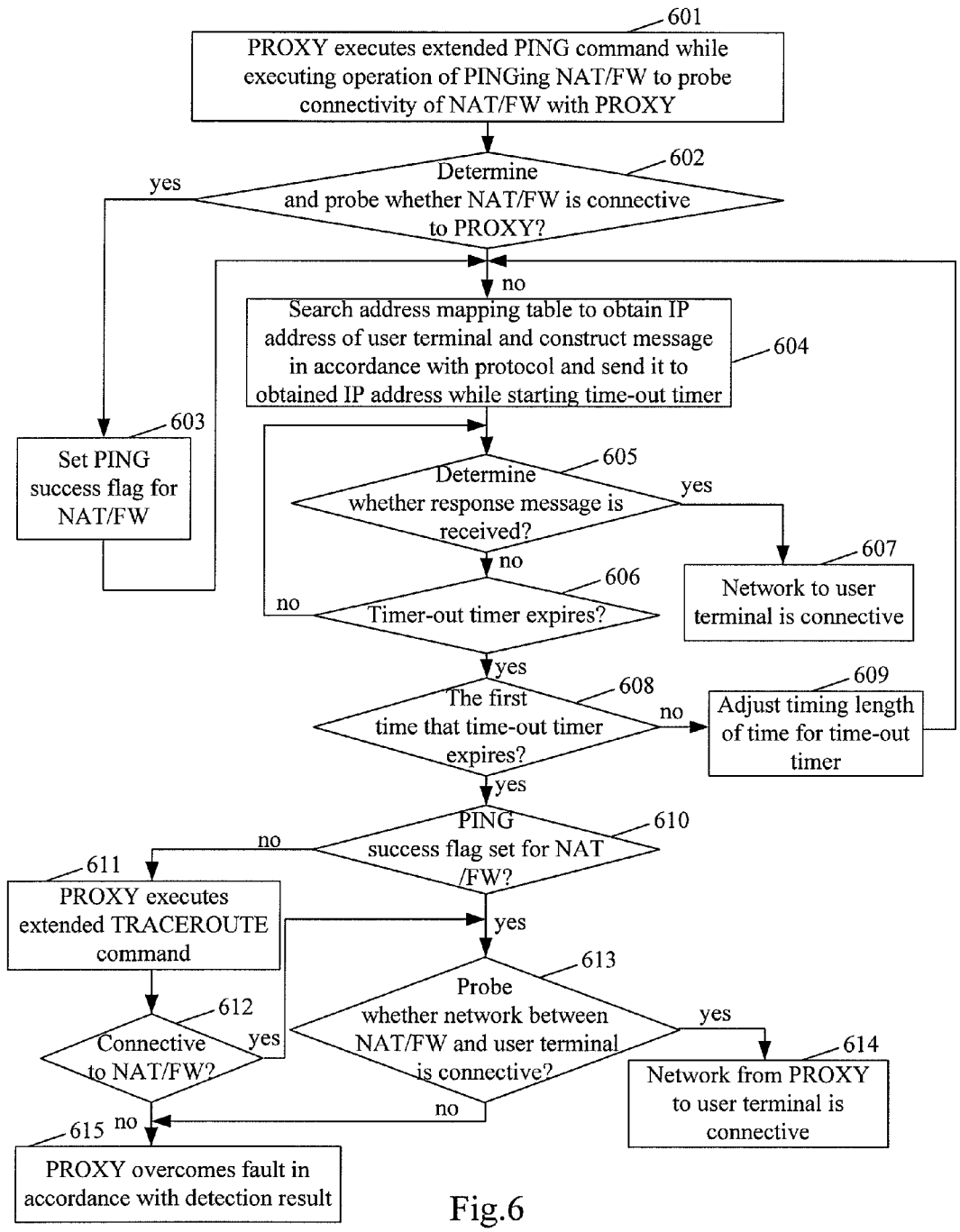
FIG. 6 is a flowchart of a network fault detection method between a PROXY and a terminal with a NAT/FW between the user terminal and the PROXY.

The invention further provides a network fault detection method between the PROXY and the user terminal with a NAT/FW between the user terminal and the PROXY in combination with the fault detection method in the absence of a NAT/FW between the user terminal and the PROXY, and a specific flow of the method is as illustrated in FIG. 6, which illustrates a flowchart of the network fault detection method between the PROXY and the user terminal with a NAT/FW between the user terminal and the PROXY. The method includes the following steps.

Step 601: The PROXY executes the extended PING command.

The command of APPPING-p pro -t term userid is executed in accordance with the created set of commands, APPPING-p pro -t type object, and a user terminal for which fault detection is required. Particularly, the term indicates that an object device for which fault probing is required is a user terminal, the userid is a symbol which identifies the user terminal, such as a telephone number, and which is recorded in the address mapping table reflecting a mapping relationship between the userid and the IP address of the user terminal.

Connectivity of the network between the PROXY and the NAT/FW device is determined in execution of the command of APPPING-p pro -t term userid in this step. Since the command of APPPING-p pro -t type object created in the invention supports the traditional PING function of the network layer, therefore the command of APPPING-p pro -t term userid in this step starts with PINGING from the PROXY an IP address of the NAT/FW device, i.e. executing a PING NAT IP operation, in accordance with the existing PING command of the network layer, where the NAT IP indicates the IP address of the NAT/FW device and is obtained through parsing by the PROXY an IP packet and even application contents in the packet in any method which is known in the art and thus irrelevant to the invention and descriptions of which will not be repeated here.

Step 602: It is determined whether the NAT IP is PINGed successfully, and if the NAT IP is PINGed successfully, the flow goes to the step 603; otherwise, the flow goes to the step 604.

In this step, a received response to the PING NAT IP operation may indicate whether it is PINGed successfully.

Step 603: A PING success flag is set for the NAT/FW device.

If successful PING is determined in accordance with the received response to the PING NAT IP operation, it is indicated that the network between the PROXY and the NAT/FW device is connective, and successful PING of the NAT/FW device is recorded in the PROXY. In other words, a PING success flag is set for the NAT/FW device.

Step 604: The PROXY constructs a message in accordance with a protocol and sends it to the user terminal while starting a time-out timer.

Because one or more protocols are used for communication between user terminals in the network, such as the protocol of SIP, MGCP or H323. Therefore, some commands in the one or more protocols may be used, such as a communication capability inquiry command (OPTION) message of the SIP, a notification request command (RQNT) instruction or an audit endpoint command (AUEP) message of the MGCP, a status inquiry request command (IRQ) message of the H323 protocol. For example, the PROXY may send on its own initiative an RQNT instruction to the user terminal. The terminal returns a response message to the PROXY upon reception of the RQNT instruction. And if the PROXY receives the response message, it is suggested there is no problem in the network connection between the PROXY and the user terminal, and if the PROXY receives no response message, it is indicated that there is a problem in the network connection between the PROXY and the user terminal.

Therefore, the IP address of the user terminal is found in the address mapping table in accordance with the userid of the user terminal. Next, the message is sent from the PROXY to the user terminal in accordance with some commands in the above one or more protocols and the time-out timer is started.

It shall be noted that the PROXY also constructs and sends the message to the user terminal even if the PING NAT IP operation indicates unsuccessful PING because the NAT/FW may possibly be a firewall disabling the PING function and the PROXY thus may receive no response to the PING command.

Step 605: The PROXY determines whether a response message is received, and if a response message is received, the flow goes to the step 607; otherwise, the flow goes to the step 606.

The user terminal may return a response message to the PROXY upon reception of the message from the PROXY.

Step 606: It is determined whether the time-out timer expires, and if it does not expire, the flow goes back to the step 605; if it expires, the flow goes to the step 608.

An initial value of the number of times that the time-out timer is set as zero when the time-out timer is started, and is incremented by one each time the time-out timer expires.

Step 607: It is prompted that the network from the PROXY to the user terminal is connective.

If the PROXY receives the response message returned from the user terminal, it is indicated no problem in the network connection between the PROXY and the user terminal and hence connectivity of the network from the PROXY to the user terminal.

Step 608: It is determined whether it is the first time that the time-out timer expires, and if it is the first time that the time-out timer expires, the flow goes to the step 609; otherwise, the flow goes to the step 610.

It is determined whether this is the first time that the time-out timer expires in accordance with the number of times of expiration. If the number of times of expiration indicates 1, it is suggested this is the first time of expiration.

Step 609: A timing length of time for the time-out timer is adjusted and the flow goes back to the step 604.

If it is the first time that the time-out timer expires, the timing length of time for the time-out timer is adjusted, for example, the timing length of time for the time-out timer is doubled relative to the original timing length of time.

Step 610: It is determined whether a PING success flag is set for the NAT/FW device, and if a PING success flag is set for the NAT/FW device, the flow goes to the step 613; otherwise, the flow goes to the step 611.

If it is not the first time that the time-out timer expires, it is suggested that the network between the PROXY and the user terminal is not connective.

Step 611: The extended TRACEROUTE command is executed.

Even if no PING success flag is set for the NAT/FW device, it cannot be determined that the network between the PROXY and the NAT/FW device is not connective because the NAT/FW may possibly be a firewall disabling the PING function and thus the PROXY may receive no PING response. Therefore, a condition of the network connection between the PROXY and the NAT/FW device is further determined.

The command of APPTRACEROUTE-p pro -t term userid is executed in this step where the userid is the identifier of the NAT/FW and the command is sent to the NAT/FW device to probe a condition of the network connection between the PROXY and the NAT/FW.

Step 612: The PROXY determines whether the PROXY is connected to the NAT/FW device in accordance with information returned from execution of the extended TRACEROUTE command, and if the PROXY is connected to the NAT/FW device in accordance with information returned from execution of the extended TRACEROUTE command, the flow goes to the step 613; otherwise, the flow goes to the step 614.

Step 613: It is further determined whether the network from the NAT device to the user terminal is connective, and if the network from the NAT device to the user terminal is connective, the flow goes to the step 614; otherwise, the flow goes to the step 615.

If the network between the PROXY and the NAT/FW device is connective, the fault occurrence range is in the network from the NAT/FW device to the user terminal, and a measure such as the measure described in detection by the NAT/FW of a condition of the connection between the NAT/FW and the terminal may be taken to further detect a condition of the network connection of the NAT device to the user terminal.

Step 614: It is prompted that the network from the PROXY to the user terminal is connective.

Step 615: A fault is overcome in accordance with a detection result.

The fault is overcome by taking a corresponding measure in accordance with the detected fault point or fault range.

Figure 7:
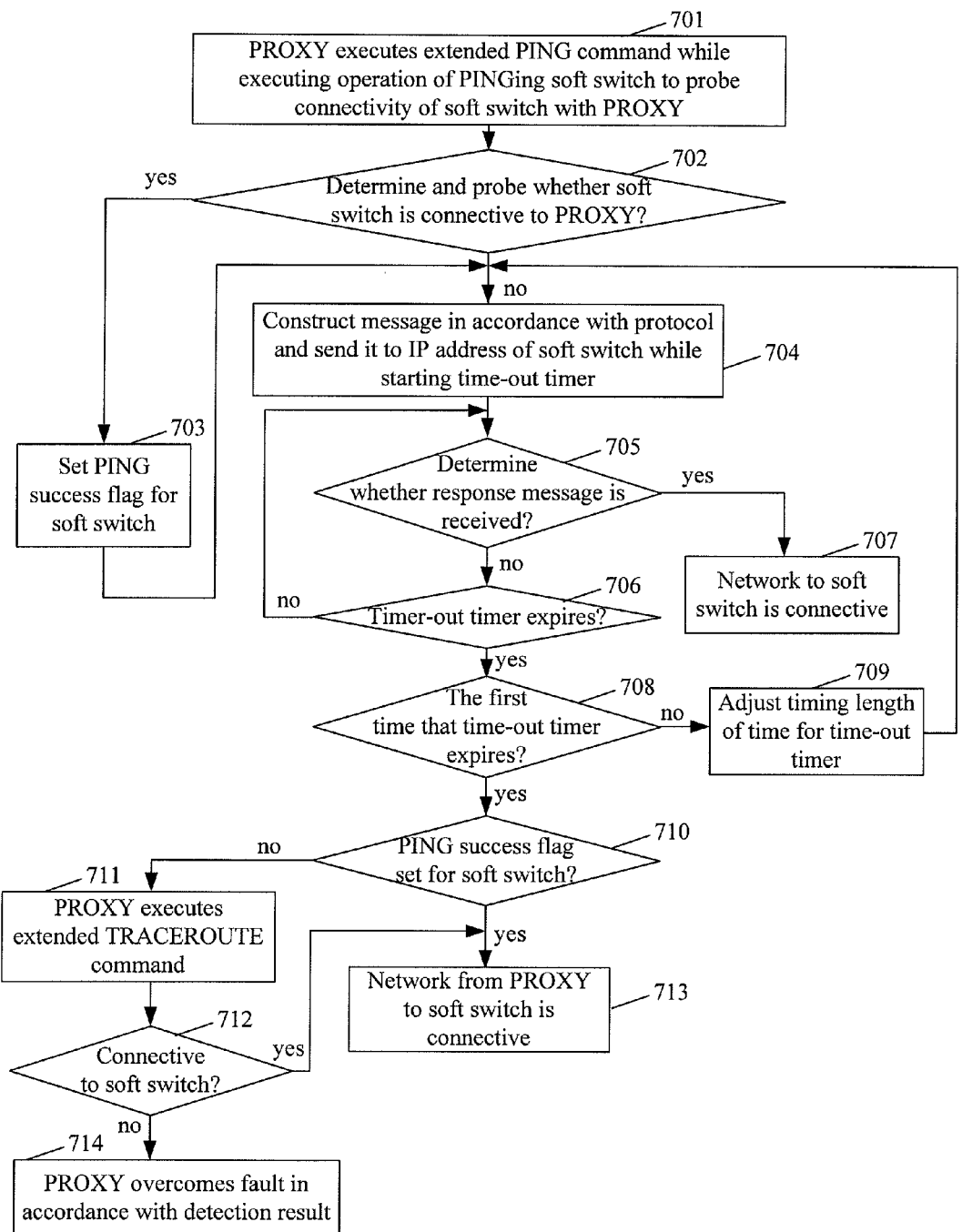
FIG. 7 is a flowchart of a network fault detection method between a PROXY and a soft switch.

Further, the invention provides a network fault detection method between the PROXY and a soft switch with a NAT/FW between the user terminal and the PROXY in combination with the fault detection method in the absence of a NAT/FW between the user terminal and the PROXY, and a specific flow of the method is as illustrated in FIG. 7, which illustrates a flowchart of the network fault detection method between the PROXY and the soft switch upon detection of no fault between the user terminal and the PROXY during network fault detection. The method includes the following steps.

Step 701: The PROXY executes the command of APPPING-p pro -t softx softxip.

The softxip indicates an IP address of a soft switch.

Step 702: It is determined whether the soft switch is PINGed successfully; if the soft switch is PINGed successfully, the flow goes to the step 703; otherwise, the flow goes to the step 704.

Step 703: A PING success flag is set for the NAT/FW device.

If successful PING is determined in accordance with a received response to the operation of PINGing the soft switch, it is suggested that that the network between the PROXY and the soft switch is connective, and successful PING of the soft switch is recorded in the PROXY, i.e. a PING success flag is set for the soft switch.

Step 704: The PROXY constructs a message in accordance with a protocol and sends it to the soft switch while starting a time-out timer.

In the NGN network, the terminal sends a keep-alive or REGISTER message to the soft switch at an interval of time to indicate that the terminal is online so as to prevent the terminal from aging. Upon reception of the message, the soft switch updates registration information time of the terminal and responds the terminal with a message. The invention uses this mechanism for the soft switch to detect a condition of the connection of the PROXY to the terminal. In other words, if the PROXY receives a response from the soft switch, it is suggested that the PROXY is connected to the soft switch; if the PROXY receives no response from the soft switch, it is suggested that the PROXY is not connected to the soft switch and a fault is present.

Because one or more protocols are used for communication between user terminals in the network, such as the protocol of SIP, MGCP or H323. Therefore, some commands in the one or more protocols may be used, such as a keep-alive or REGISTER message of the SIP, a re-registration command (RSIP) message of the MGCP, a status inquiry request command (IRQ) message of the H323 protocol, so that the PROXY may initiate on its own initiative a message to the soft switch. In accordance with the above feature of the mechanism for the soft switch, the soft switch returns a response message to the PROXY upon reception of the message.

It shall be noted that the PROXY also constructs and sends the message to the soft switch even if the operation of PINGing the soft switch indicates unsuccessful PING because the soft switch may possibly have a firewall function disabling the PING function and the PROXY thus may receive no response to the PING command.

Step 705: The PROXY determines whether a response message is received, and if a response message is received, the flow goes to the step 707; otherwise, the flow goes to the step 706.

It is determined whether a response message is received from the soft switch within a period of time.

Step 706: It is determined whether the time-out timer expires, and if it does not expire, the flow goes back to the step 705; if it expires, the flow goes to the step 708.

An initial value of the number of times that the time-out timer is set as zero when the time-out timer is started, and is incremented by one each time the time-out timer expires.

Step 707: It is prompted that the network from the PROXY to the soft switch is connective.

If the PROXY receives the response message returned from the user terminal, it is suggested that there is no problem in the network connection between the PROXY and the soft switch and hence the network from the PROXY to the soft switch is connective.

Step 708: It is determined whether it is the first time that the time-out timer expires, and if it is the first time that the time-out timer expires, the flow goes to the step 709; otherwise, the flow goes to the step 710.

It is determined whether this is the first time that the time-out timer expires in accordance with the number of times of expiration. If the number of times of expiration indicates 1, it is suggested that this is the first time of expiration.

Step 709: A timing length of time for the time-out timer is adjusted and the flow goes back to the step 704.

If it is the first time that the time-out timer expires, the timing length of time for the time-out timer is adjusted, for example, the timing length of time for the time-out timer is doubled relative to the original timing length of time.

Step 710: It is determined whether a PING success flag is set for the soft switch, and if a PING success flag is set for the soft switch, the flow goes to the step 713; otherwise, the flow goes to the step 711.

If it is not the first time that the time-out timer expires, it is suggested that the network between the PROXY and the soft switch is connective.

Step 711: The command of APPTRACEROUTE-p-t softx softxip is executed.

If the PROXY receives no response message within a period of time, it is suggested that there is a problem in the network connection between the PROXY and the soft switch, and a fault point or a fault range where a fault occurs in the network between the PROXY and the soft switch by execution of the command of APPTRACEROUTE-p-t softx softxip.

Step 712: The PROXY determines whether the PROXY is connected to the soft switch in accordance with information returned from execution of the extended TRACEROUTE command, and if the PROXY is connected to the soft switch in accordance with information returned from execution of the extended TRACEROUTE command, the flow goes to the step 713; otherwise, the flow goes to the step 714.

Step 713: It is prompted that the network from the PROXY to the soft switch is connective.

Step 714: A fault is overcome in accordance with a detection result.

The fault is overcome by taking a corresponding measure in accordance with the detected fault point or fault range.

The above descriptions are merely illustrative of the preferred embodiments of the invention but not limitative to the scope of the invention, and any modifications, equivalent alternatives and adaptations made without departing from the spirit and principle of the invention shall fall within the scope of the invention.

The invention claimed is:

1. A method for detecting fault in a next generation network, comprising:
   determining, by a PROXY, whether a NAT IP is PINGed successfully by executing a PING NAT IP operation, wherein the NAT IP indicates an IP address of a Network Address Translation or Fire Wall (NAT/FW) device between a user terminal and the PROXY;
   setting, by the PROXY, a PING success flag for the NAT/FW device in response to the determination that the NAT IP is PINGed successfully;
   searching, by the PROXY, an address mapping table to determine whether a record corresponding to a user identifier of the user terminal is found in response to the determination that the NAT IP is not PINGed successfully, wherein the address mapping table is created dynamically in the PROXY and stores correspondence relationship between user identifiers and address information of user terminals;
   constructing, by the PROXY, a message in accordance with an application layer protocol and sending the message to an IP address corresponding to the user identifier of the user terminal through the NAT/FW device in response to the determination that the record corresponding to the user identifier of the user terminal is found;
   determining, by the PROXY, whether a response message is received in response to constructing the message;
   prompting, by the PROXY, that the network from the PROXY to the user terminal is connective upon the determination that the response message is received;
   determining, by the PROXY, whether a PING success flag is set for the NAT/FW device upon the determination that the response message is not received;
   determining, by the NAT/FW device, whether the IP address of the user terminal is PINGed successfully upon the determination that the PING success flag is set for the NAT/FW device;
   determining, by the PROXY, whether the PROXY is connected to the NAT/FW device by executing a TRACEROUTE operation upon the determination that the PING success flag is not set for the NAT/FW device;
   prompting that the network from the PROXY to the user terminal is connective upon the determination that the IP address of the user terminal is PINGed successfully;
   determining whether the NAT/FW device is connected to the user terminal by executing the TRACEROUTE operation upon the determination that the IP address of the user terminal is not PINGed successfully;
   prompting that the network from the PROXY to the user terminal is connective upon the determination that the NAT/FW device is connected to the user terminal;
   determining a fault point or a fault range in accordance with a probing result upon the determination that the NAT/FW device is not connected to the user terminal;
   going back to perform the step of determining whether the IP address of the user terminal is PINGed successfully by the NAT/FW device upon the determination that the PROXY is connected to the NAT/FW device;
   determining, by the PROXY, a fault point or a fault range in accordance with a probing result upon the determination that the PROXY is not connected to the NAT/FW device.

2. The method according to claim 1, further comprising:
   creating dynamically in the PROXY the address mapping table which comprises: in a preset period of time T,
   reading the user identifier and the address information of the user terminal from a registration message and storing them correspondingly into the address mapping table when the user terminal is registered successfully; or
   removing the user identifier and the corresponding address information of the user terminal stored in the address mapping table when the user terminal is deregistered; or
   updating or aging synchronously the corresponding user identifier and address information in the address mapping table when a user identifier and corresponding address information in a registry is updated or aged.

3. The method according to claim 1, further comprising:
   upon the prompting that the network from the PROXY to the user terminal is connective, probing connectivity of the network between the PROXY and a soft switch related to the user terminal in the next generation network.

4. The method according to claim 1, further comprising:
   setting a time-out timer;

starting, by the PROXY, the time-out timer when sending the message to the IP address of the user terminal; and after no response message is received and before the PROXY determining whether a PING success flag is set for the NAT/FW device, the method further comprising:

determining whether the time-out timer expires;

going back to perform the step of determining whether the response message is received upon the determination that the time-out timer does not expire;

determining whether it is the first time that the time-out timer expires upon the determination that the time-out timer expires;

adjusting a timing length of time for the time-out timer and going back to perform the step of searching the address mapping table upon the determination that it is the first time that the time-out timer expires;

going to performing the step of the PROXY determining whether a PING success flag is set for the NAT/FW device upon the determination that it is not the first time that the time-out timer expires.

5. The method according to claim 1, wherein the message constructed by the PROXY is:

a communication capability inquiry command OPTION message of the Session Initiation Protocol SIP; or a notification request command RQNT message or an audit endpoint command AUEP message of the Media Gateway Control Protocol MGCP; or a status inquiry request command IRQ message of the H323 protocol.

6. The method according to claim 1 further comprising:

upon the step of prompting that the network between the PROXY and the user terminal is connective, constructing, by the PROXY, a message in an application layer protocol, sending the message to a soft switch related to the user terminal in the network, and probing connectivity of the network between the PROXY and the soft switch in accordance with a response message returned from the soft switch in response to the message sent by the PROXY.

7. The method according to claim 6, wherein the constructed message is:

a keep-alive message or a re-registration command REGISTER message in the Session Initiation Protocol SIP; or a re-registration command RSIP message of the Media Gateway Control Protocol MGCP; or a status inquiry request command IRQ message of the H323 protocol.

8. The method according to claim 1, wherein the address information comprises an IP address and a port number.

9. The method according to claim 1, wherein a set of commands for probing whether the network is connective and probing a network fault range is set, and the method further comprises:

creating the set of commands in accordance with a communication protocol used between users, a user type comprising a terminal and a soft switch and a user object identifying the user, and in accordance with a set of utilities, and the set of utilities comprising:

an extended probing APPPING for probing whether the network to a communication opposite end is connective and supporting the PING of the application layer and the PING function of the network layer; and an extended route probing APPTRACEROUTE for probing a fault point or a fault range where a fault occurs in the network, encapsulating a traditional TRACEROUTE function and obtaining the address information of the terminal through the PROXY in accordance with a protocol; and the set of commands comprising: an extended PING command for probing whether the network is connective and in a command format of APPPING-p pro -t type object; and an extended TRACEROUTE command for probing a network fault range and in a command format of APPTRACEROUTE-p pro -t type object, wherein the pro in the command formats indicates a protocol type; the type in the command formats indicates an object type; and the object in the command formats indicates a specific object.

10. The method according to claim 9, wherein the user object comprises an IP address or a telephone number of a user or a symbol identifying an identity of the user.

* * * * *